(12) United States Patent
Iamundi

(10) Patent No.: US 11,229,165 B2
(45) Date of Patent: Jan. 25, 2022

(54) LIGHTING APPARATUSES AND SYSTEMS FOR PLANT GROWTH

(71) Applicant: LOGENEX INNOVATIONS INC., Woodbridge (CA)

(72) Inventor: Steven Iamundi, Bolton (CA)

(73) Assignee: X19 GROWTECH CORP., Woodbridge (CA)

( * ) Notice: Subject to any disclaimer, the term of this patent is extended or adjusted under 35 U.S.C. 154(b) by 185 days.

(21) Appl. No.: 16/579,032

(22) Filed: Sep. 23, 2019

(65) Prior Publication Data
US 2020/0100433 A1 Apr. 2, 2020

(30) Foreign Application Priority Data
Sep. 28, 2018 (CA) ...................................... 3019052

(51) Int. Cl.
| | |
|---|---|
| *A01G 7/04* | (2006.01) |
| *F21S 4/24* | (2016.01) |
| *F21V 21/30* | (2006.01) |
| *A01G 31/06* | (2006.01) |
| *F21V 29/73* | (2015.01) |
| *F21Y 113/13* | (2016.01) |
| *F21Y 115/10* | (2016.01) |
| *F21Y 103/10* | (2016.01) |

(52) U.S. Cl.
CPC ............ *A01G 7/045* (2013.01); *A01G 31/06* (2013.01); *F21S 4/24* (2016.01); *F21V 21/30* (2013.01); *F21V 29/73* (2015.01); *F21Y 2103/10* (2016.08); *F21Y 2113/13* (2016.08); *F21Y 2115/10* (2016.08)

(58) Field of Classification Search
CPC .... A01G 7/045; A01G 7/31–06; F21V 29/73; F21V 21/30; F21S 4/24
See application file for complete search history.

(56) References Cited

U.S. PATENT DOCUMENTS

| | | | |
|---|---|---|---|
| 6,615,542 B2 | 9/2003 | Ware | |
| 9,435,524 B2 * | 9/2016 | Athalye | ................... F21V 3/00 |
| 2004/0223328 A1 * | 11/2004 | Lee | ........................... F21S 4/22 |
| | | | 362/249.01 |
| 2005/0190551 A1 * | 9/2005 | Rempel | .................. F21V 21/30 |
| | | | 362/162 |
| 2007/0144069 A1 | 6/2007 | Gottlieb et al. | |
| 2008/0137332 A1 * | 6/2008 | Lo | ............................. F21S 4/24 |
| | | | 362/240 |
| 2008/0302004 A1 * | 12/2008 | Lin | ....................... A01G 7/045 |
| | | | 47/58.1 LS |
| 2012/0043907 A1 * | 2/2012 | Lu | .......................... F21V 29/70 |
| | | | 315/287 |
| 2012/0120644 A1 * | 5/2012 | Rieger | ..................... F21S 4/00 |
| | | | 362/219 |
| 2012/0206914 A1 * | 8/2012 | Oza | ......................... F21V 7/00 |
| | | | 362/235 |

(Continued)

FOREIGN PATENT DOCUMENTS

| | | |
|---|---|---|
| CA | 2530695 A1 | 6/2006 |
| CA | 2950996 A1 | 12/2015 |

(Continued)

*Primary Examiner* — Bryon T Gyllstrom

(57) ABSTRACT

LED lighting apparatuses are provided for growing plants are provided that emit light based on the growth phase of the plant. Hydroponic systems are also provided that uses these LED lighting apparatuses.

12 Claims, 9 Drawing Sheets

(56) References Cited

U.S. PATENT DOCUMENTS

| | | | |
|---|---|---|---|
| 2014/0259920 A1 | 3/2014 | Wilson | |
| 2015/0204527 A1* | 7/2015 | Van Os | F21V 21/14 362/249.08 |
| 2015/0223402 A1* | 8/2015 | Krijn | A01G 7/045 47/58.1 LS |
| 2016/0109107 A1* | 4/2016 | Grajcar | F21V 29/59 362/373 |
| 2019/0116739 A1* | 4/2019 | Lys | F21V 23/003 |

FOREIGN PATENT DOCUMENTS

| | | |
|---|---|---|
| CA | 2956952 A1 | 2/2016 |
| CA | 2965619 A1 | 9/2016 |
| CA | 2990334 A1 | 9/2016 |
| CN | 10123930 A | 7/2008 |
| DE | 3634805 A1 | 4/1988 |
| EP | 0533939 B1 | 8/1995 |
| FR | 2902283 B1 | 11/2010 |
| JP | 2004329060 A | 11/2004 |

* cited by examiner

LIGHTING APPARATUSES AND SYSTEMS FOR PLANT GROWTH

RELATED APPLICATIONS

This application claims priority to Canadian Patent Application No. 3,019,052 filed Sep. 28, 2018.

FIELD

The present disclosure generally relates to the field of lighting apparatus and in particular LED lighting apparatuses and systems using same for growing plants.

BACKGROUND

Hydroponics is a method of growing plants without using soil. This technique instead uses a mineral nutrient solution in a water solvent, allowing the nutrient uptake process to be more efficient than when using soil. Terrestrial plants may be grown with only their roots exposed to the mineral nutrient solution, or the roots may be supported by an inert medium, such as perlite or gravel. The nutrients in hydroponics can come from an array of different sources, including waste byproducts. Hydroponics possesses several advantages over a soil medium. Unlike plants grown in soil, plants grown in a hydroponics system do not need to develop extensive root structures to search for nutrients. It is easier to test and adjust pH levels. In the hydroponics method, plants are raised in an inert and pH balanced growing medium where the plants only need to expend minimal energy to acquire nutrients from the roots. The energy saved by the roots is better spent on fruit and flowering production.

However, the initial set up cost of hydroponic system is high, requiring adequate indoor space and lighting as well as constant supervision. Hydroponic systems are also susceptible to power outages or excessive heat generation from lighting equipments, resulting in plants drying out or suboptimal growth. Accordingly, improved hydroponic systems and equipment are needed for improved plant growth.

SUMMARY

Lighting apparatuses and hydroponic systems are provided for efficient growth of plants, such as *cannabis*.

In one aspect, there is provided a flexible light emitting diode (LED) strip for providing light to a plant, the LED strip comprising a plurality of surface mounted LEDs, the plurality of surface mounted LEDs comprising: one or more blue surface mounted LEDs that emit light in the range of 400-500 nm; one or more red surface mounted LEDs that emit light in the range of 620-780 nm; or combinations thereof.

In one embodiment, the one or more blue surface mounted LEDs emit light of about 440 nm. In one embodiment, the one or more red surface mounted LEDs emit light of between 650-670 nm. In one embodiment, the one or more red surface mounted LEDs emit light at a peak wavelength of 660 nm. In one embodiment, the flexible LED strip has at least 70/m of the blue surface mounted LEDs. In one embodiment, the flexible LED strip has at least 120/m of the red surface mounted LEDs.

In another aspect, there is provided a lighting apparatus for providing light to a plant, the apparatus comprising: a support member; and one or more flexible LED strips mounted on the support member; wherein each of the one or more flexible LED strips comprises one or more blue surface mounted LEDs that emit light in the range of 400-500 nm, one or more red surface mounted LEDs that emit light in the range of 620-780 nm, or combinations thereof.

In one embodiment, the lighting apparatus comprises one or more blue LED strips, one or more red LED strips, or combinations thereof; wherein the one or more blue LED strips have only blue surface mounted LEDs, and wherein the one or more red LED strips have only red surface mounted LEDs. In one embodiment, the lighting apparatus comprises only blue LED strips. In one embodiment, the lighting apparatus comprises only red LED strips.

In one embodiment, the support member is a screen extendable from a folded configuration to expose the one or more flexible LED strips. In one embodiment, the support member is comprised of a plurality of elongated heatsink sheets, and each of the one or more flexible LED strips is mounted on one of the plurality of elongated heatsink sheets. In one embodiment, each of the plurality of elongated heatsink sheets is attached to an adjacent heatsink sheet by a hinge joint configured to allow the support member to fold into a folded configuration. In one embodiment, each of the plurality of elongated heatsink sheets comprises a hook for engaging a pivot pin.

In another aspect, there is provided a hydroponic system for growing a plant, the system comprising: a vertical plant support structure; at least one lighting apparatus; and an extendible frame structure for supporting and positioning the at least one lighting apparatus adjacent to the vertical plant support structure; wherein the at least one lighting apparatus comprises a support member and one or more flexible LED strips mounted on the support member; wherein each of the one or more flexible LED strips having one or more blue surface mounted LEDs that emit blue light in the range of 400-500 nm, one or more red surface mounted LEDs that emit red light in the range of 620-780 nm, or combinations thereof; and wherein the support member is a flexible screen extendable from a folded configuration to expose the one or more flexible LED strips for emitting light towards the vertical plant support structure.

In one embodiment, the extendible frame structure is operably mounted to the vertical plant support structure. In one embodiment, the at least one lighting apparatus is removably supported by the extendible frame structure.

In one embodiment, the system comprises a first and a second lighting apparatus positioned respectively adjacent to a first and a second side of the vertical plant support structure. In one embodiment, the first lighting apparatus has one or more blue surface mounted LEDs configured to emit blue light during the vegetative phase of the plant. In one embodiment, the second lighting apparatus has one or more red surface mounted LEDs configured to emit red light during the flowering phase of the plant.

In one embodiment, the extendible frame structure is extendible to an extended configuration for positioning the at least one lighting apparatus further away from the vertical plant support structure. In one embodiment, the extendible frame structure is retractable to a retracted configuration for positioning the at least one lighting apparatus closer to the vertical plant support structure. In one embodiment, the extendible frame structure is further extendible vertically for controlling the vertical positioning of the at least one lighting apparatus.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments of devices, apparatus, methods, and kits are described throughout reference to the drawings.

DETAILED DESCRIPTION

Numerous details are set forth to provide an understanding of the examples described herein. The examples may be practiced without these details. The description is not to be considered as limited to the scope of the examples described herein.

Plant Growth and Development

Many factors contribute to the growth and development of plants in hydroponic systems, including but not limited to, availability of space, efficiently delivery of light, quality of light, efficient monitoring of mineral nutrient solutions, light and nutrient schedules.

As used herein, "plants" refer to green plants, land plants, algae, and fungi. Examples of plants that can be grown in an hydroponic system includes, but are not limited to vegetables, fruits, mushrooms, moss, grass, algae, fern, herbs, and medicinal plants. In some embodiments, systems and apparatuses are provided for growing medicinal plants. In one preferred embodiment, systems and apparatuses are provided for growing *cannabis*.

As used herein, "*cannabis*" refers to plants used for the production of hemp fiber and/or for the extraction of a cannabinoid compound, such as cannabidiol (CBD), tetrahydrocannabinol (THC), cannabinol (CBN), cannabichromene (CBC), cannabigerol (CBG), tetrahydrocannabivarin (THCV) cannabigerol, cannabicyclol, or other compounds. Examples of *cannabis* includes, but are not limited to, *Cannabis sativa*, *Cannabis indica*, *Cannabis ruderalis*, and hybrids thereof.

Figure 1A:
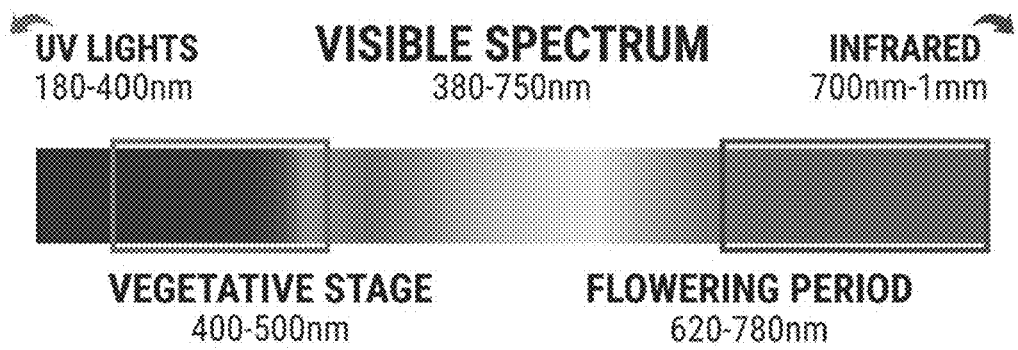
FIG. 1A shows a schematic illustration of the visible light spectrum and the range of wavelength of light needed for supporting growth of *cannabis* during the vegetative state and the flowering period.

Providing proper lighting is important for optimal growth of plants, and in particular the wavelengths of light provided influence the efficiency of plant growth. As shown in FIG. 1A, plants have different lighting needs depending the phase of growth. During the vegetative phase plants are optimally grown using light between 400 to 500 nm. While during the flowering phase plants are optimally grown using light between 620 to 780 nm. As used herein "vegetative phase" refers to the growth and/or developmental stage of a plant, which begins after germination and before flowering, during which the plant develops the majority of its foliage and biomass. During the vegetative stage, plants are carrying out the process of photosynthesis to accumulate resources and nutrients that are required for subsequent reproduction and flowering stages. As used herein, "flowering phase" refers to the phase where plants produce their flower sets, including the production of fruits, when plants are directing their energy towards reproduction.

However, existing artificial light sources are inefficient, as they emit light of various wavelengths and often generate a lot of heat. As well, existing artificial light sources often take up significant floor space, limiting the amount of remaining floor space available for actual plant growth. One example of an artificial light sources for providing light during the vegetative phase of a plant is a metal halide (MH) bulb, which is only has 9.5-17% efficiency. One example of an artificial light source for providing light during the flowering phase of a plant is a high-pressure sodium (HPS) bulb, which has about 12-22% efficiency. Furthermore, these light bulbs generate a large amount of heat, which can damage the plants if not monitored properly.

In some embodiments, artificial light sources for growing plants are provided that reduces energy consumption. In some embodiments, artificial light sources for growing plants are provided that increases efficiency by emitting light of desired wavelengths bases on the growth phase of the plant. In some embodiments, artificial light sources for growing plants are provided that reduced the amount of space needed. In some embodiments, artificial light sources for growing plants are provided for reducing cost of manufacturing the artificial light sources.

LED Strips

Figure 2A:
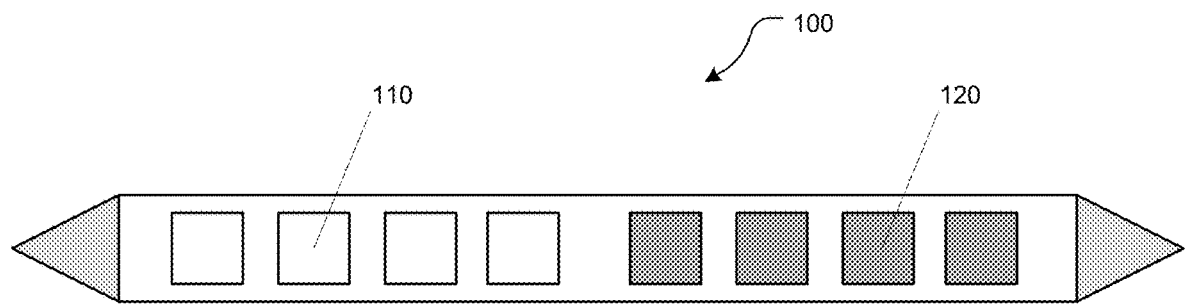
FIG. 2A is a top plan view of a schematic diagram of an embodiment of a LED strip having two different types of surface mounted LEDs.
Figure 2B:
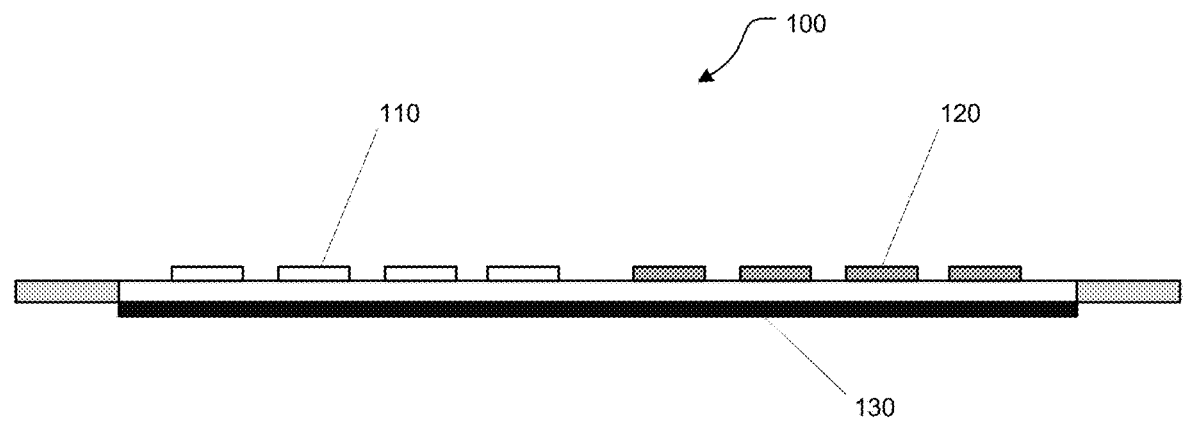
FIG. 2B is a side of a schematic diagram of the LED strip of FIG. 2A.

Turning to FIGS. 2A and 2B, in some embodiments a light emitting diode (LED) strip 100 is provided for growing plants. LED lights require low energy consumption. As well, LED lights are more efficient as they allow for the emission of light of specific wavelengths. The LED strip may be of varying lengths. In embodiments where the LED strip is long, the strips have traces of higher cross-sectional area by increasing the width and/or the thickness so as to reduce electrical resistance introduced by the traces. By the reducing the electrical resistance of the traces, the brightness of the LED strip is maintained along the length of the entire strip. In some embodiments, the LED strip is 3 ft long, 4 ft long, 5 ft long, 6 ft long, 7 ft long, 8 ft long, 9 ft long, 10 ft long, 11 ft long, 12 ft long, or more.

In some embodiments, the LED strip has an adhesive backing 130 for mounting the LED strip onto a support structure. Other mounting mechanism can also be used. In some embodiments, the LED strip is rigid in order to support the length of the strip. In other embodiments, the LED strip is flexible and is mounted onto a support structure.

The LED strip has a plurality of surfaced mounted LEDs. In some embodiments, a LED strip has only one type of surface mounted LED. In one embodiment, the LED strip has surface mounted LEDs that emit light in the range of 350-550 nm, 400-500 nm, 425-475 nm, or more preferably around 440 nm for providing light to a plant during the vegetative phase. In one embodiment, the LED strip has surface mounted LEDs that emit light with a peak wavelength of around 440 nm.

In another embodiment, a LED strip has surface mounted LEDs that emit light in the range of 575-8250 nm, 620-780 nm, 620-700 nm, 650-670 nm, or more preferably around 660 nm for providing light to a plant during the flowering phase. In one embodiment, the LED strip has surface mounted LEDs that emit light with a peak wavelength of around 660 nm.

In an alternate embodiment, a LED strip has one or more first surface mounted LEDs 110, and one or more second surface mounted LEDs 120. In some embodiments there are as many first surfaced mounted LEDs as there are second surfaced mounted LEDs. In other embodiments the number of first surface mounted LEDs differ from the number of second surface mounted LEDs. In some embodiments, the first and second surfaced mounted LEDs are arranged in an alternating pattern. In other embodiments, the first surface mounted LEDs are arranged separately from the second surface mounted LEDs. Other arrangements of the first and second surfaced mounted LEDs are also possible.

In some embodiments, the first surface mounted LEDs 110 emit light in the range of 400-500 nm, while the second mounted LEDs 120 emit light in the range of 620-780 nm. In some embodiments, the second surface mounted LEDs 110 emit light in the range of 400-500 nm, while the first mounted LEDs 120 emit light in the range of 620-780 nm.

In some embodiments of a LED strip having both first and second surface mounted LEDs, both first and second surface mounted LEDs are lit simultaneously. In other embodiments, the first surface mounted LEDs are lit separately from the second surfaced mounted LEDs. In some embodiments, the first surface mounted LEDs are lit asynchronously from the second surface mounted LEDs. In some embodiments, the first surfaced mounted LEDs are controlled separately from the second surface mounted LEDs. In one embodiment, the first surface mounted LEDs are controlled to be lit during the vegetative or flowering phase of the plant, while the second surfaced LEDs are controlled to be lit during the other phase of the plant.

In some embodiments, surface mounted LEDs are spaced evenly apart from each other. In other embodiments, surface mounted LEDs are spaced unevenly apart from each other. In some embodiments, a LED strip has sufficient number or density of surface mounted LEDs distributed along the length of the strip to provide substantially consistent light output along the entire length of the LED strip. In some embodiments, surface mounted LEDs that emit light in the range of 400-500 nm are distributed along the length of the LED strip such that there are 50-100 LEDs/m of the strip, at least 50/m, at least 70/m, at least 90/m, or at least 100/m in order to provide even lighting across the length of the LED strip. In some embodiments, surface mounted LEDs that emit light in the range of 620-780 nm are distributed along the length of the LED strip such that there are 100-200 LEDs/m of the strip, at least 120/m, at least 150/m, at least 175/m, or greater than 200/m in order to provide even lighting across the length of the LED strip. In one embodiment, both first surface mounted LEDs that emit light in the range of 400-500 nm and second surface mounted LEDs that emit light in the range of 620-780 nm are distributed along the length of the LED strip such that there are about 70 first surface mounted LEDs/m of the strip and about 120 second surface mounted LEDs/m of the strip.

In some embodiments, an LED strip provides light to a plant. In one embodiment, the plant is *cannabis*. In some embodiments, an LED strip provides light to a growing or developing *cannabis* plant based on the phase of growth. In some embodiments, an LED strip that emits light in the range of 400-500 nm is used to provide light to a *cannabis* plant during the vegetative phase. In some embodiments, an LED strip that emits light in the range of 620-780 nm is used to provide light to a *cannabis* plant during the flowering phase. In one embodiment, an LED strip selectively emits light in the range of 400-500 nm or 620-780 nm to a *cannabis* plant during the vegetative or flowering phase, respectively.

LED Lighting Apparatuses

Figure 3:
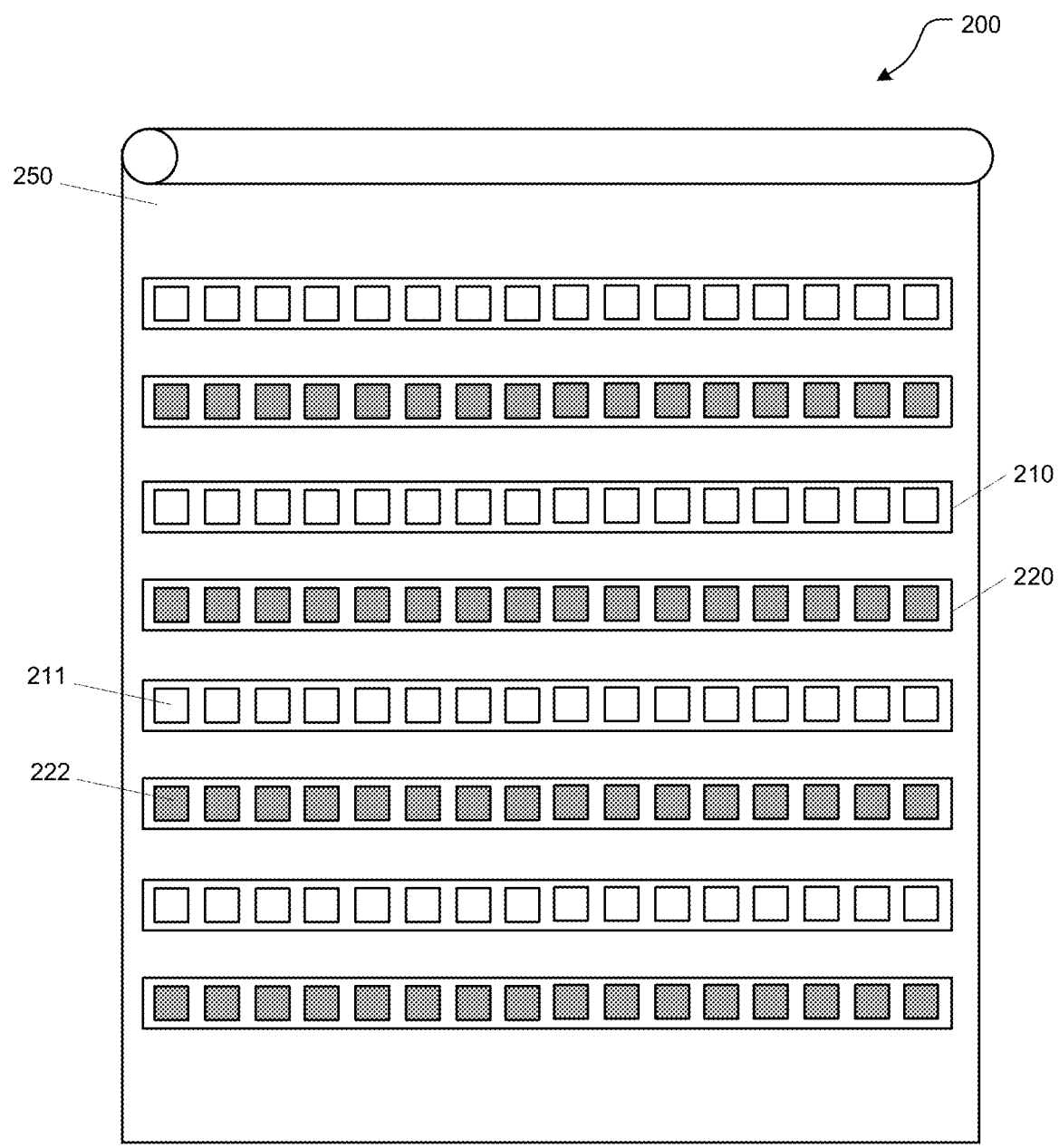
FIG. 3 is a schematic diagram of an embodiment of a LED lighting apparatus having embodiments of the LED strip mounted thereon.

Turning to FIG. 3, a lighting apparatus 200 is shown for providing light to a plant. In some embodiments, the lighting apparatus has one or more LED strips mounted on a support member 250 for supporting the one or more LED strips. In some embodiments, a lighting apparatus has the LED strips as described herein mounted on a support member. In some embodiments there are more than 5 LED strips mounted on a support member, more than 10 LED strips mounted on a support member, more than 20 LED strips mounted on a support member, or 40 or more LED strips mounted on a support member. In one embodiment, there is about 40 LED strips mounted on a support member. The lighting apparatus can be of various lengths and dimensions.

In some embodiments, the LED strips are mounted horizontally on the support member and spaced apart from each other. In some embodiments, the LED strips are mounted vertically on the support member and spaced apart from each other. In some embodiments, the LED strips are diagonally mounted on the support member and spaced apart from each other. In some embodiments, the LED strips are spaced evenly apart from each other. In other embodiments, the LED strips are spaced unevenly apart from each other. In some embodiments, the LED strip are spaced apart by about 1 mm, about 2 mm, about 5 mm, or about 1 cm.

In some embodiments, the support member is a rigid support structure. In one embodiment, the rigid support structure is a frame. In one embodiment, LEDs are suspended from a rigid support structure. In one embodiment, the support member is a folding screen, such as a retractable screen or an accordion screen that is extendible vertically (up and down) and/or horizontally (left and right). In one embodiment, the support member is a panel. In one embodiment, the screen or panel is flat. In other embodiments, the screen or panel is curved. In one embodiment, the support member is a blind. In some embodiments, the support member is a flexible support member. In one embodiment, the flexible support structure is a draped or suspended fabric. In one embodiment, the support member is rolled screen. In some embodiments, the support member is extendible from a folded configuration to expose the LED strips mounted thereon, thereby emitting light. The support member is extended or folded using motorized means, or other known mechanisms.

In some embodiments, a LED strip mounted on a support member has a plurality of first surfaced mounted LEDs 211.

In some embodiments, a LED strip mounted on a support member has a plurality of second surfaced mounted LEDs 222. In some embodiments, a LED strip mounted on a support member has a plurality of both first and second surface mounted LEDs 211, 222. In one embodiment, the first surfaced mounted LEDs of a lighting apparatus emit light in the range of 400-500 nm for providing light to a plant during the vegetative phase. In one embodiment, the first surfaced mounted LEDs of a lighting apparatus emit light with a peak wavelength of about 440 nm. In one embodiment, the second surfaced mounted LEDs of a lighting apparatus emit light in the range of 620-780 nm for providing light to a plant during the flowering phase. In one embodiment, the second surfaced mounted LEDs of a lighting apparatus emit light with a peak wavelength of about 660 nm. In one embodiment, the first and second surfaced mounted LEDs of a lighting apparatus are selectively controlled to emit light during the vegetative or flowering phases, respectively.

In some embodiments, a lighting apparatus has a plurality of first LED strips 210, each having blue surface mounted LEDs, that emit light in the range of 400-500 nm. The lighting apparatus having the first LED strips 210 that emit light in the range of 400-500 nm is used to provide light to a plant during the vegetative phase. In one embodiment, a lighting apparatus has a plurality of first LED strips 210 that emit light with a peak wavelength of about 440 nm. In some embodiments, a lighting apparatus has a plurality of second LED strips 220, each having red surface mounted LEDs, that emit light in the range of 620-780 nm. The lighting apparatus having the second LED strips 220 that emit light in the range of 620-780 nm is used to provide light to a plant during the flowering phase. In one embodiment, a lighting apparatus has a plurality of second LED strips 220 that emit light with a peak wavelength of about 660 nm.

In alternate embodiments, a lighting apparatus has a plurality of both first and second LED strips 210, 220. In one embodiment, the first LED strips of a lighting apparatus emit light in the range of 400-500 nm for providing light to a plant during the vegetative phase. In one embodiment, the first LED strips of a lighting apparatus emit light with a peak wavelength of about 440 nm. In one embodiment, the second LED strips of a lighting apparatus emit light in the range of 620-780 nm for providing light to a plant during the flowering phase. In one embodiment, the second LED strips of a lighting apparatus emit light with a peak wavelength of about 660 nm. In some embodiments there are as many first LED strips as there are second LED strips. In other embodiments the number of first LED strips differ from the number of second LED strips. In some embodiments, the first and second LED strips are arranged in an alternating pattern. In other embodiments, the first surface LED strips are arranged separately from the second LED strips. Other arrangements of the first and second LED strips are also possible.

In some embodiments of a lighting apparatus having both first and second LED strips, both the first and LED strips are lit simultaneously. In other embodiments, the first LED strips are lit separately from the second LED strips. In some embodiments, the first LED strips are lit asynchronously from the second LED strips. In some embodiments, the first LED strips are controlled separately from the second LED strips. In one embodiment, the first LED strips are controlled to be lit during the vegetative or flowering phase of the plant, while the second LED strips are controlled to be lit during the other phase of the plant.

In some embodiments, a LED strip-mounted lighting apparatus provides light to a plant. In one embodiment, the plant is *cannabis*. In some embodiments, an LED strip-mounted lighting apparatus provides light to a growing or developing *cannabis* plant based on the phase of growth. In some embodiments, an LED strip that emits light in the range of 400-500 nm is used to provide light to a *cannabis* plant during the vegetative phase. In some embodiments, an LED strip that emits light in the range of 620-780 nm is used to provide light to a *cannabis* plant during the flowering phase. In one embodiment, an LED strip selectively emits light in the range of 400-500 nm or 620-780 nm to a *cannabis* plant during the vegetative or flowering phase, respectively.

Figure 4A:
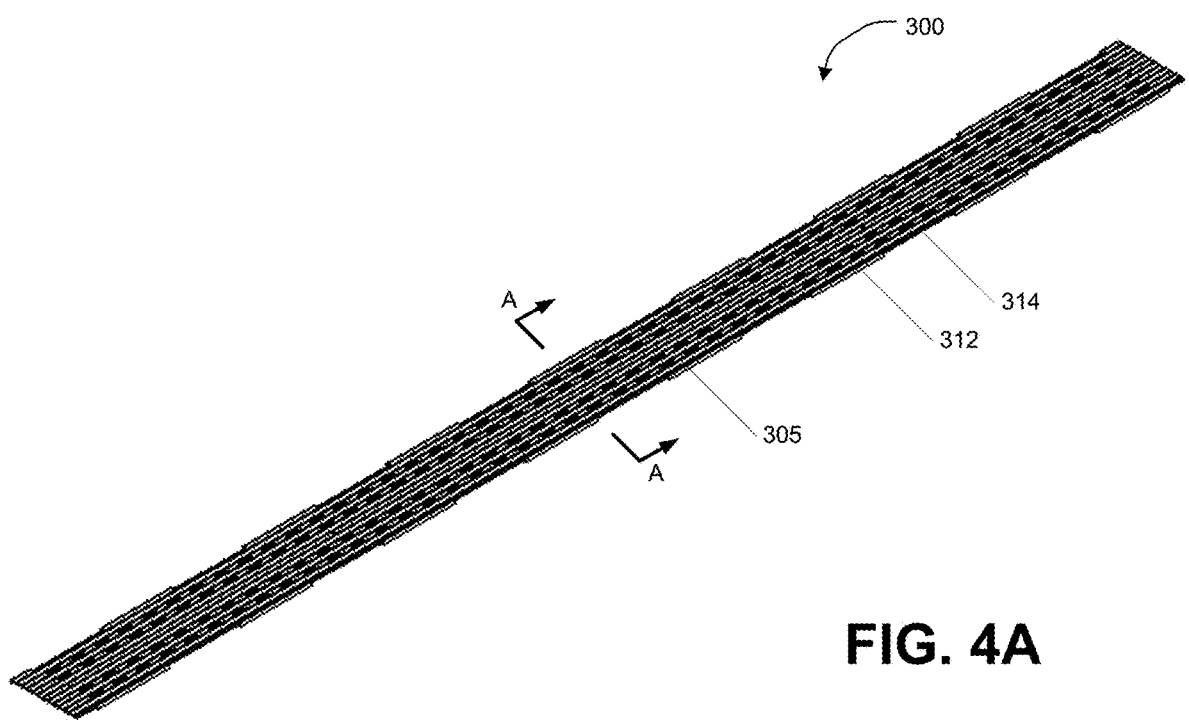
FIG. 4A shows an embodiment of a heatsink sheet.
Figure 4B:
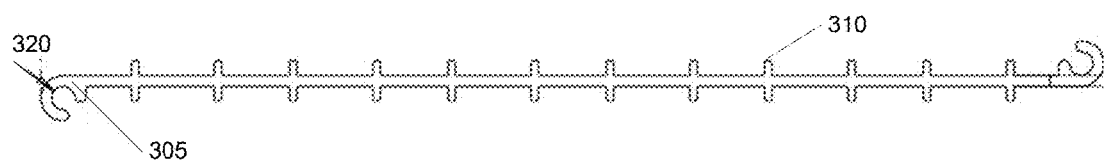
FIG. 4B is a cross-sectional view of the heatsink sheet of FIG. 4A taken along section line A-A.

In one embodiment, the support member is made from a plurality of heatsink sheets, and each LED strip is mounted on a heatsink sheet. As used herein, a heatsink sheet refers a device made of a material that allows for absorption and dissipation of excessive heat. In preferred embodiments, the heatsink sheets are made of aluminum or an aluminium alloy. In other embodiments, the heatsink sheets are made of copper. Other materials are also available. As shown in FIG. 4A, a heatsink sheet 300 is of variable length and dimensions, but are preferably elongated thin strips. As shown in FIG. 4B, a heatsink sheet has numerous fins 310 for efficient dissipation of heat. In some embodiments, each heatsink sheet is attached to an adjacent heatsink in a hinged fashion, allowing the plurality of heatsink sheets to fold into a folded configuration. In one embodiment, the support member made of plurality of heatsink sheets folds in an accordion fashion. In other embodiment, the support member made of plurality of heatsink sheets folds in a rolled fashion.

Figure 5:
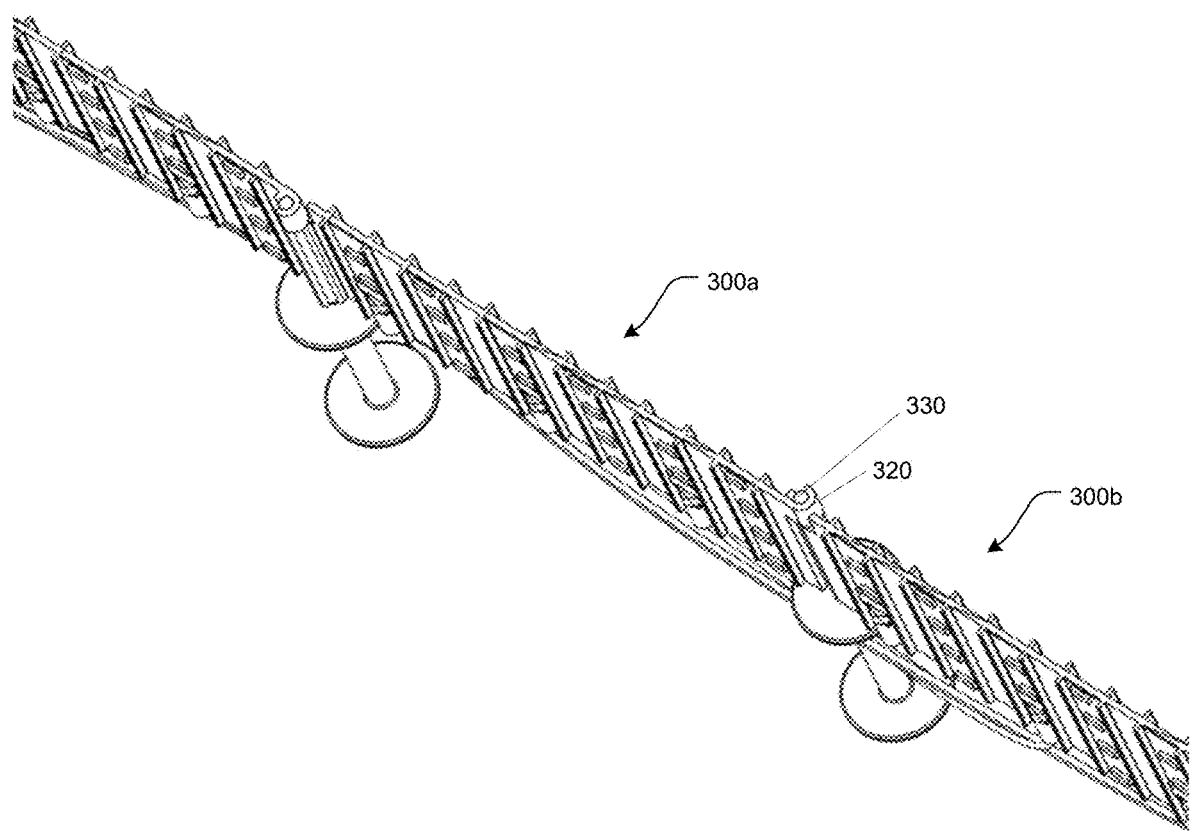
FIG. 5 is a perspective sectional view of three heatsink sheets hingedly connected together by two pivot pins.
Figure 6:
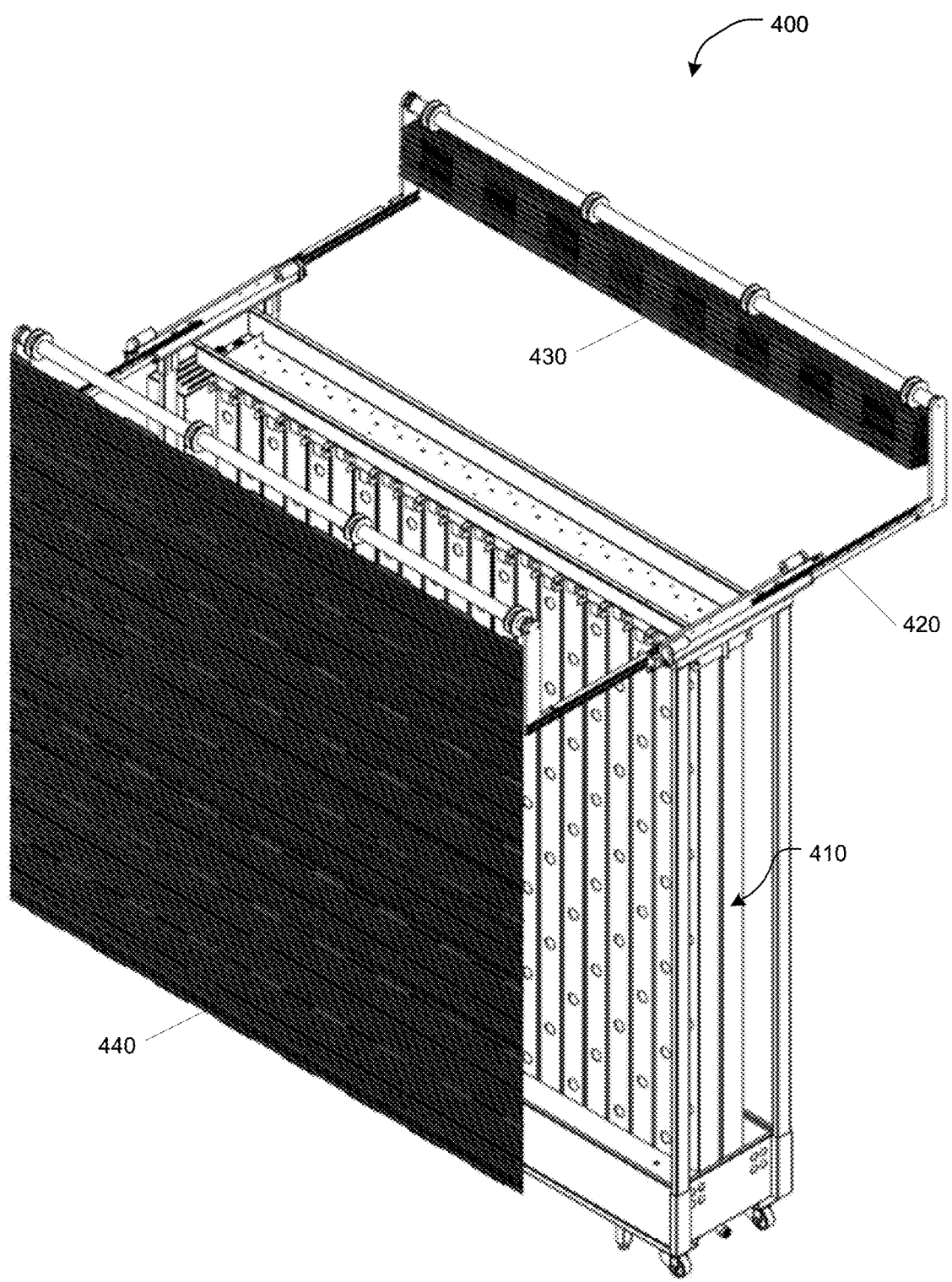
FIG. 6 is a perspective view of a hydroponic system having two lighting apparatus, one of each side of a plant support structure. The hydroponic system is shown in an extended configuration. One of the lighting apparatus is unfolded, and the other is folded in an accordion fashion.
Figure 7:
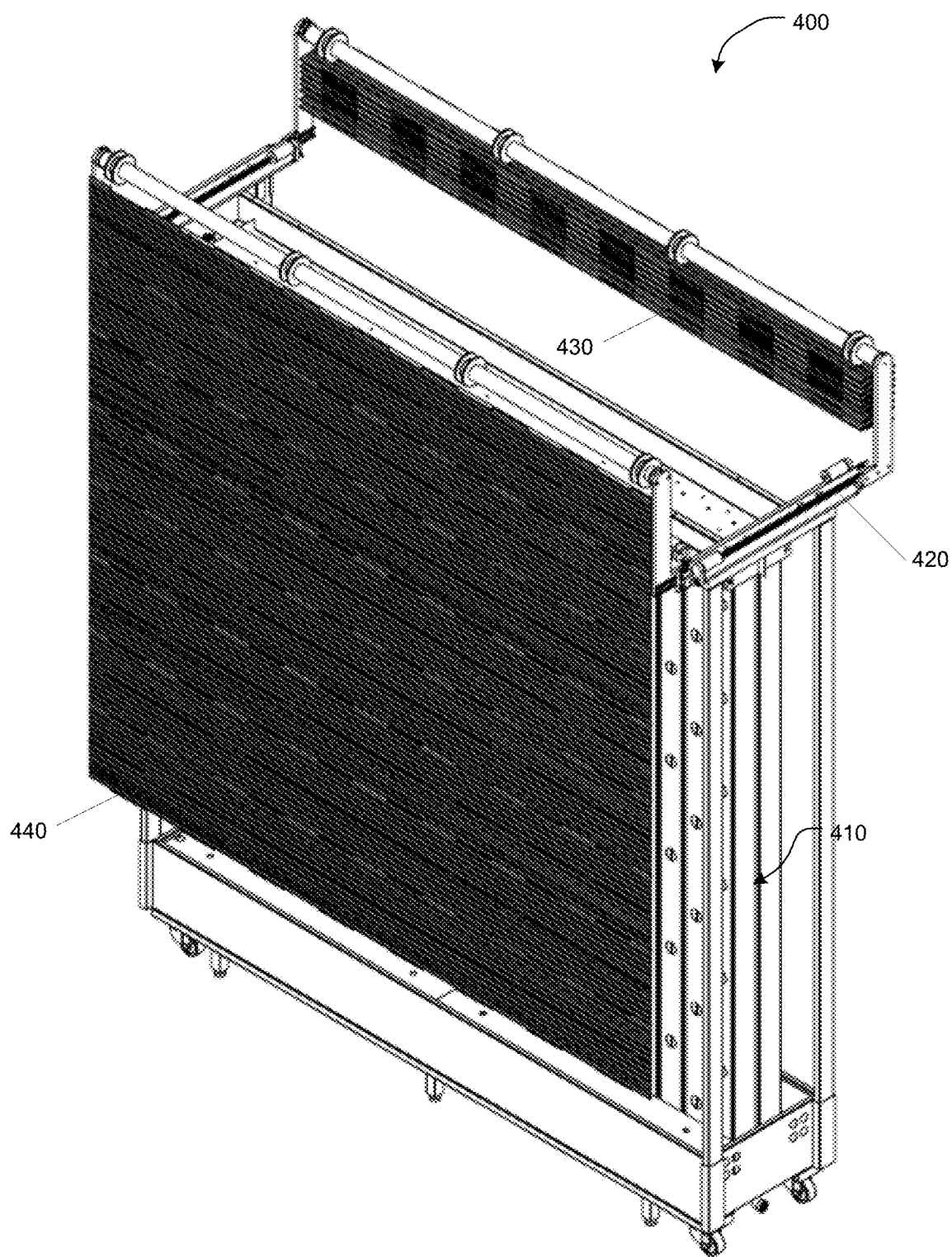
FIG. 7 is a perspective view of a hydroponic system having two lighting apparatus, one of each side of a plant support structure. The hydroponic system is shown in a retracted configuration. One of the lighting apparatus is unfolded, and the other is folded in an accordion fashion.
Figure 8:
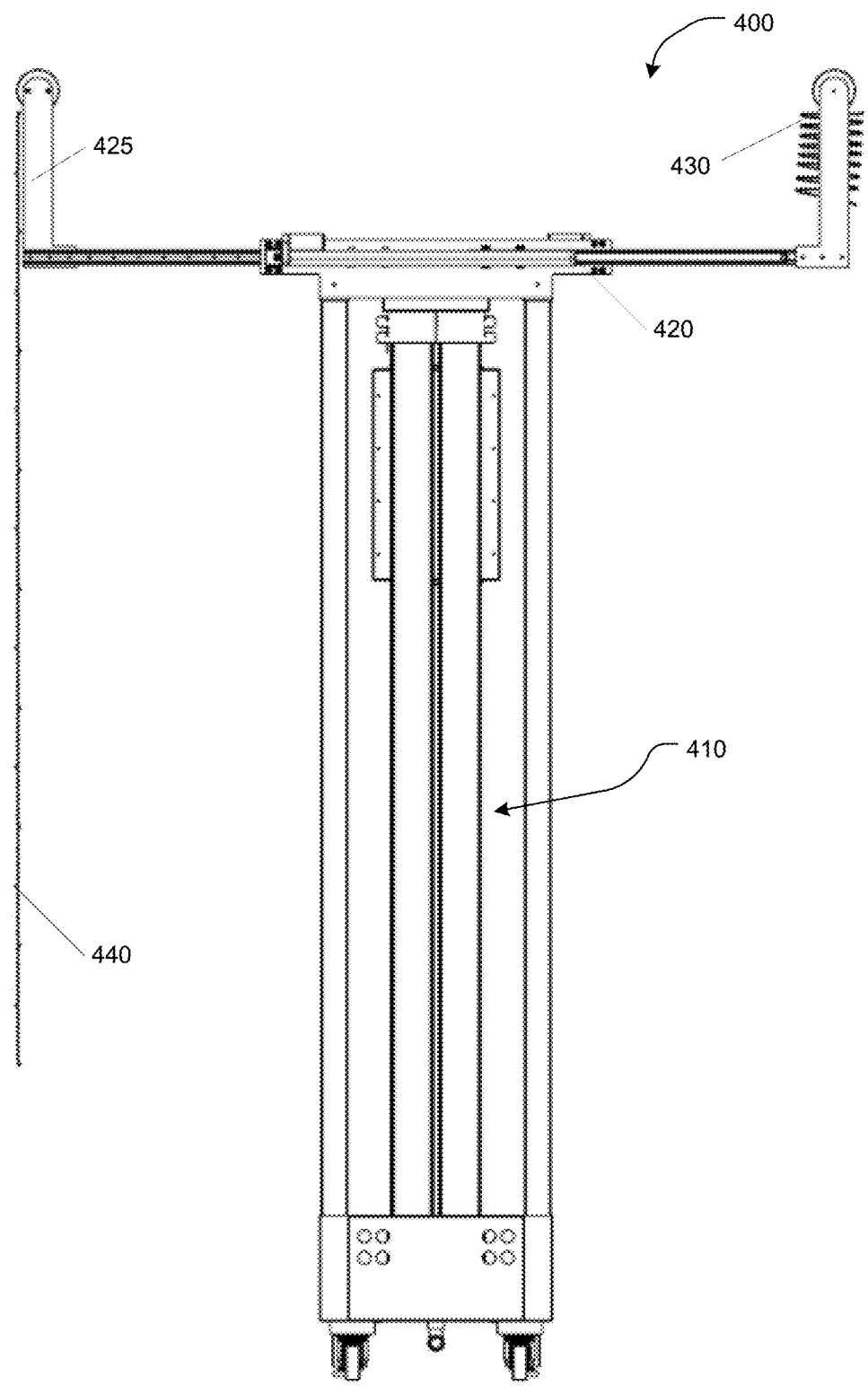
FIG. 8 is a right side view of the hydroponic system of FIG. 6 in an extended configuration.
Figure 9:
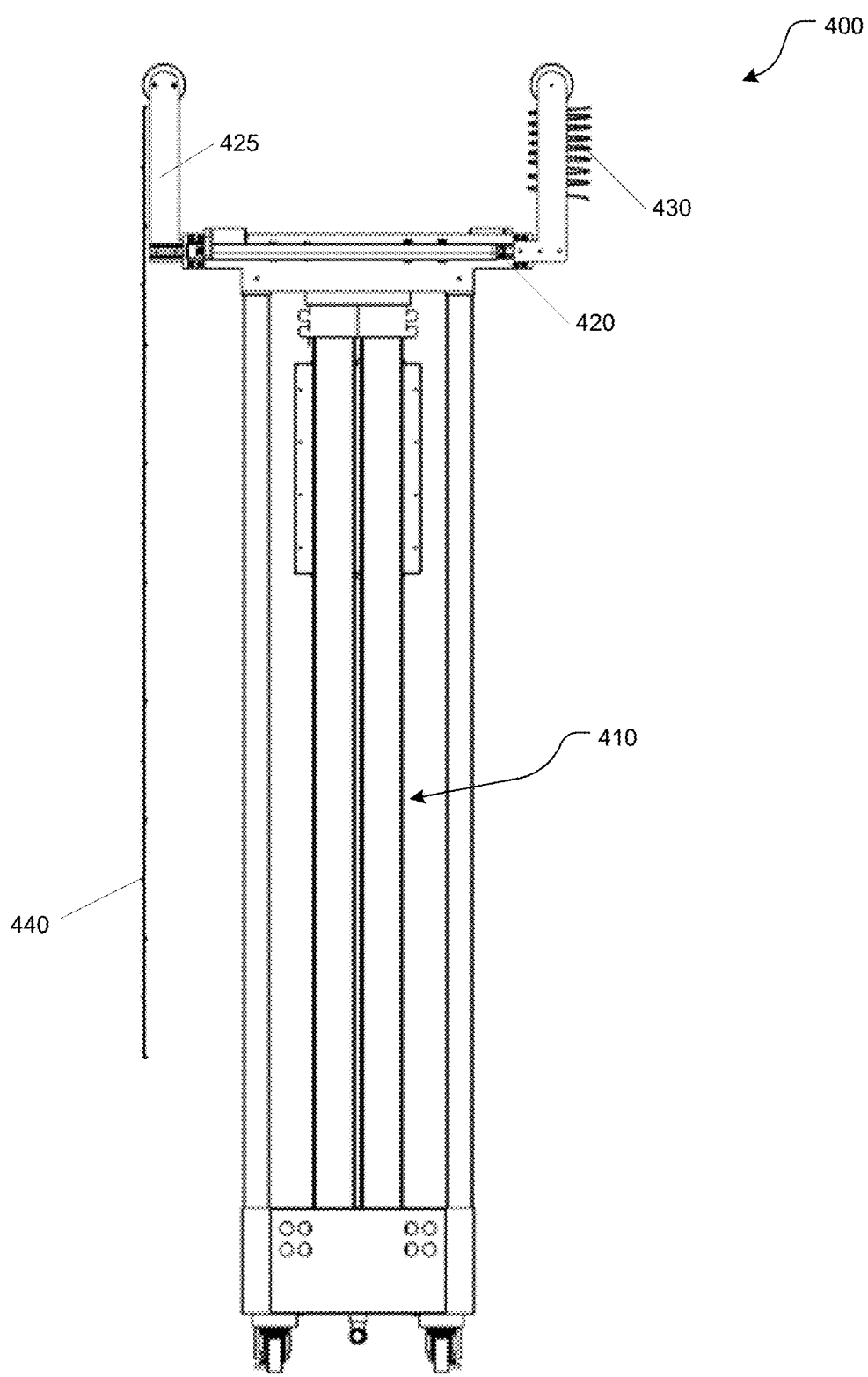
FIG. 9 is a right side view of the hydroponic system of FIG. 7 in a retracted configuration.

In some embodiments, a heatsink sheet 330a is hinge joined to an adjacent heatsink sheet 330b along a longitudinal edge 305. In one embodiment, a heatsink sheet has a hook 320 along the longitudinal edge to engage a pivot pin 330, as shown in FIG. 5. Along the longitudinal edge of a heatsink sheet, there are a plurality of longitudinal hooks 312 that alternates with a plurality of gap spacing 314, allowing for two heatsink sheets to be attached to a pivot pin along their longitudinal edges and thereby creating a hinged joint.

Hydroponic Systems

Turing to FIGS. 6 to 9, a hydroponic system 400 for growing a plant includes a plant support structure 410 and an extendible frame for positioning one or more lighting apparatuses adjacent the plant support structure. The extendible frame has one or more extendible arms 425, each for suspending or supporting a lighting apparatus. In one embodiment, the extendible frame is mounted onto the plant support structure, attaching the one or more lighting apparatuses to the plant support structure. In other embodiments, the extendible frame is a standalone structure or a standalone structure that can be coupled with the plant support structure, for positioning one or more lighting apparatuses adjacent the plant support structure. In some embodiments, the lighting apparatuses are removably supported by the extendible frame, for replacement with different or new lighting apparatuses.

In some embodiments, the plant support structure is a vertical plant support structure having a plurality of pods for holding plants. Examples of plant support structures are described in U.S. Pat. No. 9,814,186, US20170105360, and U.S. Pat. No. 6,615,542, the entire content of which is incorporated herein by reference. In some embodiments, the vertical support structure is for hydroponic cultivation of plants. In one embodiment, the vertical support structure is for hydroponic cultivation of *cannabis*. The hydroponic system, including the plant support structure and the extendible frame, can be of various different lengths and dimensions.

In some embodiments, a hydroponic system for growing a plant includes one or more lighting apparatuses as described herein. In some embodiments the lighting apparatus emits blue light in the range of 400-500 nm. In one embodiment, the lighting apparatus emits blue light with a peak wavelength of 440 nm. In some embodiments, a lighting apparatus emits red light in the range of 620-780 nm. In one embodiment, the lighting apparatus emits red light with a peak wavelength of 660 nm. In some embodiments, a lighting apparatus selectively emits both blue and red light in the range of 400-500 nm and 620-780 nm, respectively.

In one embodiment where a lighting apparatus emits both blue and red light, the blue and red lights are emitted synchronously. In one embodiment where a lighting apparatus emits both blue and red light, the blue and red lights are emitted asynchronously. In some embodiments, lighting apparatus is configured such that blue light is emitted during the vegetative phase of a plant, and red light is emitted during the flowering phase of a plant.

In some embodiments, a lighting apparatus that emits blue light is placed adjacent to a plant support structure during the vegetative phase. In some embodiments, two lighting apparatuses that emit blue light are placed on opposite sides adjacent to a plant support structure during the vegetative phase. When the plant develops into the flowering phase, the lighting apparatus that emits blue light is replaced with a lighting apparatus that emits red light. In some embodiments, two lighting apparatuses that emit red light are placed on opposite sides adjacent to a plant support structure during the flowering phase.

In alternate embodiments, a hydroponic system has a first lighting apparatus 430 placed adjacent one side of a plant support structure and a second lighting apparatus 440 placed adjacent an opposite side of the plant support structure. In one embodiment, the first lighting apparatus emits blue light in the range of 400-500 nm. In one embodiment, the first lighting apparatus emits blue light with a peak wavelength of 440 nm. In some embodiments, the second lighting apparatus emits red light in the range of 620-780 nm. In one embodiment, the second lighting apparatus emits red light with a peak wavelength of 660 nm. In some embodiments, the hydroponic system is configured such that the first surface mounted LEDs are controlled to be lit during the vegetative or flowering phase of the plant, while the second surfaced LEDs are controlled to be lit during the other phase of the plant.

In some embodiments, a hydroponic system has lighting apparatuses that folds into a folded configuration when light is not needed. In some embodiments, a hydroponic system has lighting apparatuses that unfold to expose the LED strips mounted thereon to emit light toward a plant support structure. In embodiments of the hydroponic system having a first and second lighting apparatus 430, 440, one is folded into a folded configuration while the other is unfolded to provide appropriate light during the vegetative or flowering phase.

In some embodiments, the extendible frame 420 positions the lighting apparatuses closer to or further away from the plant support structure 410 as needed. The extendible frame is extendible by using, for example, telescoping poles, scissor extension, sliding tracks, or other extension mechanisms. In one embodiment, the extendible frame is motorized.

In the extended configuration (see FIGS. 6 and 8), the lighting apparatuses are positioned further away from the plant support structure. In the retracted configuration (see FIGS. 7 and 9), the lighting apparatuses are positioned closer to the plant support structure. In some embodiments, the extendible frame 420 is also extendible vertically, relative to the ground, to position the height of the lighting apparatus. By adjusting the position of the lighting apparatuses relative to the plant support structure, the intensity of light as well as the level of heat generated around the plant can be controlled and monitored as needed. As well, as the plant grows in size, the position of the lighting apparatuses can be adjusted relative to plant allowing for consistent or controlled spacing between the plant and the lighting apparatus.

In one embodiment in the extended configuration, the lighting apparatuses is positioned at most 36 inches from the plant support structure. In one embodiment in retracted position, the lighting apparatuses is positioned at a minimum of 6 inches from the plant support structure. Preferably, the lighting apparatus is positioned such that it is about half an inch or more from the nearest foliage.

EXAMPLES

Example 1—High Performance Red LED

Figure 1B:
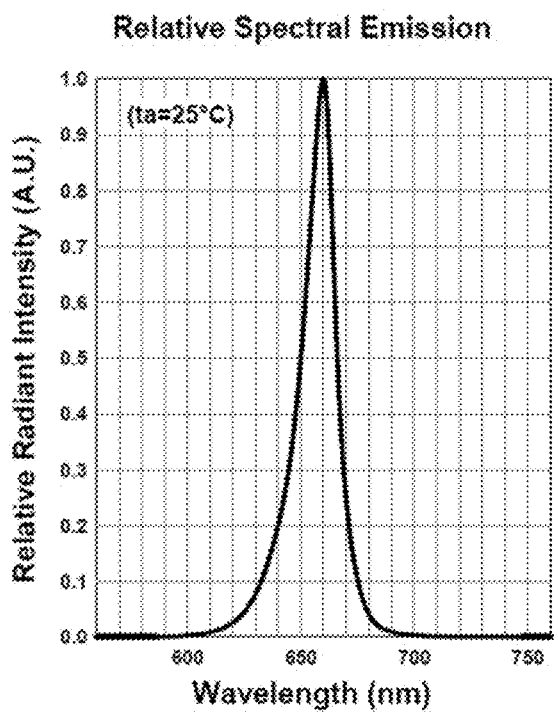
FIG. 1B shows a relative spectral emission of a red LED.

Turning to FIG. 1B, to provide light having proper wavelength for encouraging *cannabis* growth during the flowering phase, a red surface mounted LED is selected that emits red light at a peak wavelength of 660 nm. A Epitex SMT660N™ red LED light is used, that is silver plated and has a lens made of silicone resin or epoxy resin. Table 1 summarizes the absolute maximum ratings of this red LED light, and Table 2 summarizes the electro-optical characteristics of the red LED.

TABLE 1

| Absolute Maximum Ratings of the red LED [Ta = 25° C.] | | | |
| --- | --- | --- | --- |
| Item | Symbol | Maximum Rated Value | Unit |
| Power Dissipation | $P_D$ | 120 | mW |
| Forward Current | $I_F$ | 50 | mA |
| Pulse Forward Current | $I_{FP}$ | 300 | mA |
| Reverse Voltage | $V_R$ | 5 | V |
| Thermal Resistance | $R_{thja}$ | 80 | K/W |
| Junction Temperature | $T_j$ | 120 | ° C. |
| Operating Temperature | $T_{OPR}$ | −40~+100 | ° C. |
| Storage Temperature | $T_{STG}$ | −40~+100 | ° C. |
| Soldering Temperature | $T_{SOL}$ | 250 | ° C. |

TABLE 2

| Electro-Optical Characteristics of the red LED [Ta = 25° C.] | | | | | | |
| --- | --- | --- | --- | --- | --- | --- |
| Item | Symbol | Condition | Minimum | Typical | Maximum | Unit |
| Forward Voltage | $V_F$ | $I_F$ = 20 mA | | 2.0 | 2.4 | V |
| | $V_{FP}$ | $I_{FP}$ = 300 mA | | 3.4 | | |
| Radiated Power | $P_O$ | $I_F$ = 20 mA | 9.0 | 12 | | mW |
| | | $I_{FP}$ = 300 mA | | 180 | | |

TABLE 2-continued

Electro-Optical Characteristics of the red LED [Ta = 25° C.]

| Item | Symbol | Condition | Minimum | Typical | Maximum | Unit |
|---|---|---|---|---|---|---|
| Radiant Intensity | $I_E$ | $I_F$ = 20 mA | | 4.8 | | mW/sr |
| | | $I_{FP}$ = 300 mA | | 72 | | |
| Luminous Flux | ΦV | $I_F$ = 20 mA | | 1.0 | | lm |
| Peak Wavelength | λP | $I_F$ = 20 mA | 650 | 660 | 670 | nm |
| Half Width | Δλ | $I_F$ = 20 mA | | 16 | | nm |
| Viewing Half Angle | θ ½ | $I_F$ = 20 mA | | ±60 | | deg. |
| Rise Time | tr | $I_F$ = 20 mA | | 30 | | ns |
| Fall Time | tf | $I_F$ = 20 mA | | 30 | | ns |

Example 2—LED Strips

The red LED of Example 1 or a blue LED is mounted on an Edison PLCC Lightbar FPC 7S HE™. To maintain the power and brightness of the LEDs along the entire length of the LED strip, traces having large cross-areas are selected.

Available blue LED strips were sourced that meets the requirement of equal power and brightness output along the entire length of the strip.

A red LED strip was used to provide even and efficient delivery of red light to a plant during the vegetative phase, while a blue LED strip was used to provide even and efficient delivery of blue light to a plant during the flowering phase. Similarly, for growing *cannabis*, different LED strips are needed during the vegetative and flowering phases of *cannabis*. Details of the LED strips for the two phases are summarized in Table 3.

TABLE 3

LED strip specification for growing *cannabis* during vegetative and flowering phases

| | Vegetative Phase | Flowering Phase |
|---|---|---|
| Colour of LED | Cool White | Red |
| number of LEDs per meter of strip | 70/m | 120/m |
| $V_{in}$ | 24 V | 24 V |
| Lm/m | 2200 lm | 200 lm |
| $P_{out}$/m | 15 W | 9.6 W |
| $I_{fv}$/m | 615 mA | 400 mA |

Example 3—LED Screen Shade and Hydroponic System Assembly for *Cannabis*

A red screen shade was mounted with 40 LED strips of red LEDs for used during the flowering phase of *cannabis*, while a blue screen shade was mounted with 40 LED strips of blue LEDs for used during the vegetative phase of *cannabis*. Each LED strip is 8 feet in length spanning the width of the screen shade, and arranged vertically spaced apart from each other by 2 mm.

A hydroponic system was constructed with a vertical hydroponic pods and an extendible frame that supports two LED screen shade (one red screen shade and one blue screen shade) on opposite sides of the vertical hydroponic pods (see FIGS. 6 to 9). The red and blue screen shades are controlled such that during the vegetative phase of *cannabis* the blue screen shade is lit. When the *cannabis* transitions to the flowering phase, the blue screen shade is folded and the red screen shade is lit.

For a screen shade having 40 LED strips, and each strip having 144 LEDs, one screen can provide about 172,800 lm of light as calculated in Table 4. To power 150 screen shades, 450 kW of power is needed as calculated in Table 5.

TABLE 4

Lumen calculation for a screen of 10 LED strips having 144 LEDs per strip

144 LEDs per strip
1 LED = 30 lm
144 LEDs × 30 lm × 40 strips = 172,800 lm per side

TABLE 5

Power consumption calculation for 150 units of LED strips each having 40 strips of LED, and 144 LEDs per strip.

Strip consumption = 1.5 A @ 24 V
# of strips per shade = 4
Total current per shade => $I_{total}$ = 1.5 × 40 = 60 A
Total power consumption per shade = 60 A × 24 V = 1440 W
Total power consumption used for illumination per unit => P = 2 × 1440 = 2880 W
For supply calculations the power was rounded up => P = 3000 W
$P_{total}$ = 150 units × P = 150 × 3000 = 450000 W = 450 kW = 450 kVA (PF = 1.0)
Power supply to location: 3 phase; 347 phase voltage
$I_{supply}$ = 1000 × 450 kVA/(3 × 347 V) = 433 A Each hydroponic system with the extendible frame in the fully retracted configuration requires 32 sqft, and in the fully extended configuration requires 50 sqft. Each of these hydroponic system is estimated to provide 55 lbs of dried *cannabis*.

Example 4—*Cannabis* Yield Comparison

The production yield of *cannabis* using the hydroponic system of Example 3 was compared against known methods of cultivation. A current known *cannabis* cultivation system uses a central lamp surrounded by potted *cannabis* plants. In this arrangement, a 5 ft by 5 ft space with 5-7 pots of *cannabis* plant placed around a central lamp supplied with 2000 watts of energy will produce 1.5 lbs of *cannabis* plant biomass. On average, this known *cannabis* cultivation system yields 0.06 lbs of *cannabis* plant biomass per sq. ft.

On the other hand, a 8 ft by 4 ft space can be fitted with 220 pots of *cannabis* plants on a vertical support system, and fitted with LED screen shades of Example 3. The LED screen shades provided with 1940 watts of energy will produce 55 lbs of *cannabis* plant biomass. On average, the hydroponic system yields 1.72 lbs of *cannabis* plant biomass per sq. ft.

Although the embodiments have been described in detail, it should be understood that various changes, substitutions and alterations can be made herein. Moreover, the scope of the present application is not intended to be limited to the particular embodiments or examples described in the specification. As can be understood, the examples described above and illustrated are intended to be exemplary only.

For example, the present invention contemplates that any of the features shown in any of the embodiments described herein, may be incorporated with any of the features shown in any of the other embodiments described herein, and still fall within the scope of the present invention.

The invention claimed is:

1. A hydroponic system for growing a plant, the system comprising:
   a vertical plant support structure;
   at least one lighting apparatus; and
   an extendible frame structure for supporting and positioning the at least one lighting apparatus adjacent to the vertical plant support structure;
   wherein the at least one lighting apparatus comprises a support member and one or more flexible LED strips mounted on the support member;
   wherein each of the one or more flexible LED strips having one or more blue surface mounted LEDs that emit blue light in the range of 400-500 nm, one or more red surface mounted LEDs that emit red light in the range of 620-780 nm, or combinations thereof; and
   wherein the support member is a flexible screen extendable from a folded configuration to expose the one or more flexible LED strips for emitting light towards the vertical plant support structure.

2. The hydroponic system of claim 1, wherein the extendible frame structure is operably mounted to the vertical plant support structure.

3. The hydroponic system of claim 1, wherein the at least one lighting apparatus is removably supported by the extendible frame structure.

4. The hydroponic system of claim 1, wherein the system comprises a first and a second lighting apparatus positioned respectively adjacent to a first and a second side of the vertical plant support structure.

5. The hydroponic system of claim 4, wherein the first lighting apparatus has one or more blue surface mounted LEDs configured to emit blue light during the vegetative phase of the plant.

6. The hydroponic system of claim 4, wherein the second lighting apparatus has one or more red surface mounted LEDs configured to emit red light during the flowering phase of the plant.

7. The hydroponic system of claim 1, wherein the extendible frame structure is extendible to an extended configuration for positioning the at least one lighting apparatus further away from the vertical plant support structure.

8. The hydroponic system of claim 1, wherein the extendible frame structure is retractable to a retracted configuration for positioning the at least one lighting apparatus closer to the vertical plant support structure.

9. The hydroponic system of claim 1, wherein the extendible frame structure is further extendible vertically for controlling the vertical positioning of the at least one lighting apparatus.

10. The hydroponic system of claim 1, wherein the plant is *cannabis*.

11. The hydroponic system of claim 1, wherein the support member is comprised of a plurality of elongated heatsink sheets, and each of the one or more flexible LED strips is mounted on one of the plurality of elongated heatsink sheets.

12. The hydroponic system of claim 11, wherein each of the plurality of elongated heatsink sheets is attached to an adjacent heatsink sheet by a hinge joint configured to allow the support member to fold into a folded configuration, the hinge joint comprising a hook engaged with a pivot pin.

* * * * *